United States Patent Office
3,454,356
Patented July 8, 1969

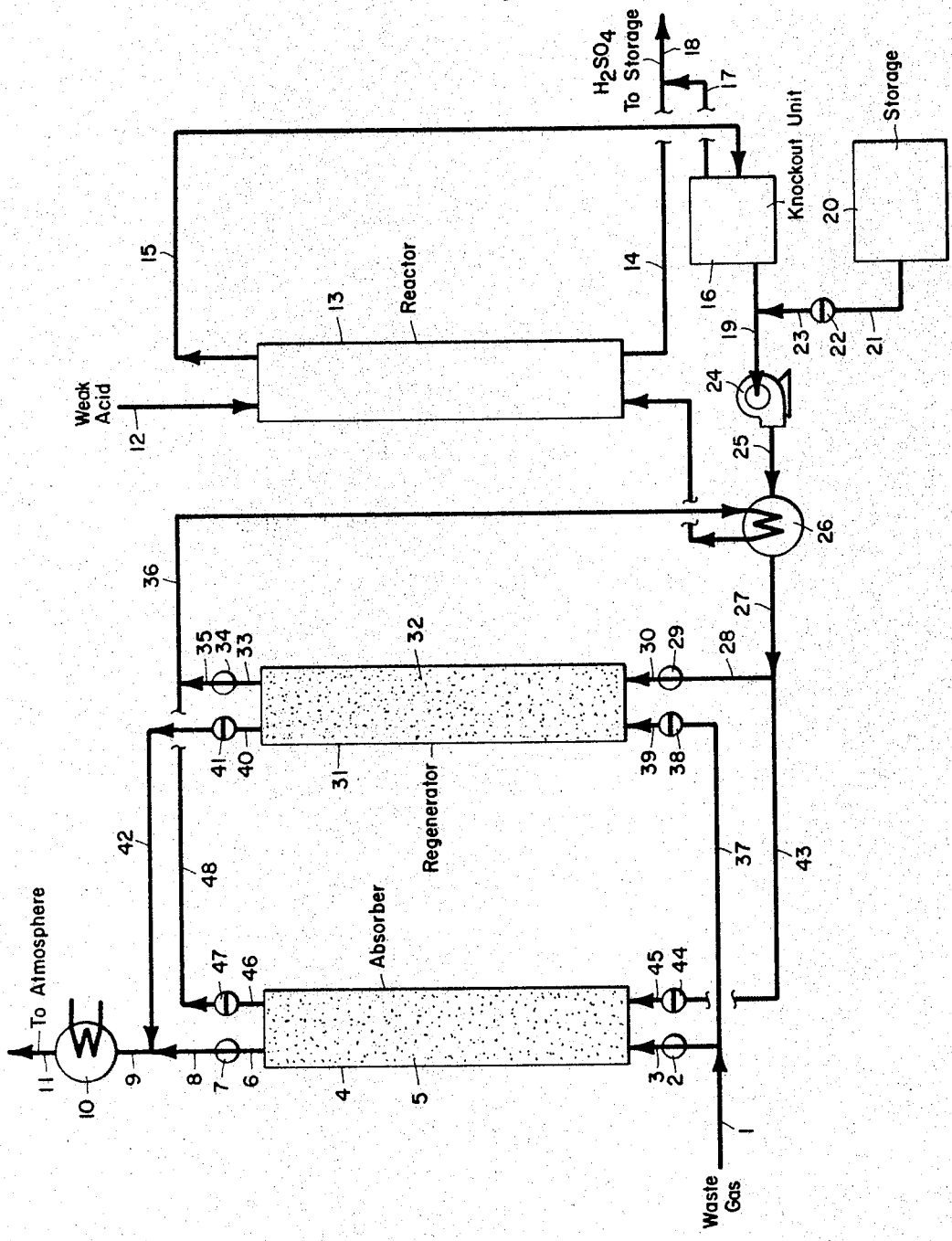

3,454,356
PROCESS FOR REMOVING SULFUR OXIDES FROM GASES
Anantha K. S. Raman, Scotch Plains, N.J., assignor to Esso Research and Engineering Company, a corporation of Delaware
Filed July 11, 1966, Ser. No. 564,198
Int. Cl. B01d 49/00
U.S. Cl. 23—2          6 Claims

ABSTRACT OF THE DISCLOSURE

Sulfur ovides are removed from waste gases by contacting the waste gases with a catalyst-absorbent material comprising vanadium trioxide, vanadium tetroxide and mixtures thereof. The spent catalyst-absorbent is regenerated by heating at elevated temperatures in the presence of sulfur dioxide.

---

This invention relates to an improved process for the removal of oxides of sulfur from waste gases, and more particularly to a process comprising contacting a flue gas with a lower oxide of vanadium as a catalyst-absorbent material to render such gas harmless. In another aspect, the invention relates to a process wherein sulfur dioxide is recovered from flue gases and converted to commercially valuable sulfuric acid and wherein the vanadium oxide utilized is regenerated.

Sulfur oxides are a constituent of many waste gases such as smelter gases, flue gases, off gases from chemical processes and stack gases from coal-burning furnaces. Contamination of the atmosphere by sulfur dioxide or trioxide has been a public health problem for many years due to its irritating effect on the respiratory system, its adverse effect on plant life and its corrosive attack on many metals, fabrics and building materials. Nevertheless, such sulfur oxide is a useful and valuable raw material for the chemical industry.

Many methods have been proposed for removing sulfur dioxide from waste gases. Processes based upon catalytic oxidation of sulfur dioxide to sulfur trioxide and formation of sulfuric acid by reaction with water have been described. Other proposed processes employ absorbent materials such as chalk, carbonaceous materials and alkaline materials, usually in aqueous suspension. Other methods include the use of a mixture of manganese dioxide and lower oxides of manganese in aqueous suspension for absorption of sulfur dioxide followed by calcination of the thus formed manganese sulfate to regenerate manganese oxide. In addition, it is now generally known that removal of sulfur dioxide can be effected by a process comprising the use of an alkali metal oxide on an alumina or chromia support for absorption of sulfur dioxide followed by regeneration by treatment with a hot reducing gas.

Many of the prior art processes are, however, deficient in that the maximum concentration of sulfuric acid obtainable is only about 70%, and in some instances even lower. Moreover, in many prior art processes the sulfur dioxide is generated from the absorbent and must, therefore, be processed to sulfur trioxide for sulfuric acid by-product production. Another objection to the conventional methods is that the liquid phase absorption technique acts to cool the treated gas which subsequently has a higher density and tends to settle in the vicinity of the stack. As a result, local pollution may become worse, even though the amount of sulfur compounds admitted to the atmosphere is reduced.

It is accordingly an object of this invention to provide a process for the recovery of sulfur oxides from waste gases containing sulfur oxides wherein recovery of same is substantially complete.

Another object is to provide a process which is capable of recovering sulfur trioxide in a commercially useful form and which permits ready regeneration of the absorbent material.

Still another object is to provide a process in which the sulfur oxides are removed from waste gas with a minimum of cooling thereof.

Other objects and advantages will become apparent from a reading of the following disclosure.

According to the present invention, these and other objects are achieved by a process which includes the separation of sulfur oxides from waste gases by contacting the waste gases with a catalyst-absorbent material comprising solid vanadium trioxide, vanadium tetroxide, or mixtures thereof. The contact of the waste gases with the vanadium oxide results in the catalystic conversion of sulfur dioxide to sulfur trioxide which thereupon reacts with the vanadium oxide to form a spent absorbent, i.e. vanadyl (and/or vanadium) sulfate. The spent absorbent is then treated to regenerate the vanadium trioxide or vanadium tetroxide.

In accordance with the invention, regeneration of vanadium trioxide or vanadium tetroxide is effected by heating the spent absorbent at elevated temperatures in a sulfur dioxide atmosphere to yield the vanadium oxide and sulfur trioxide. The sulfur trioxide thus formed is subsequently utilized for the manufacture of concentrated sulfuric acid.

The invention will become more readily apparent from the following detailed description taken in conjunction with the accompanying drawing in which is presented a flow diagram showing a preferred embodiment.

The vanadium catalyst-absorbent used herein comprises the lower oxides of vanadium, i.e., $V_2O_3$ and $V_2O_4$, and does not include the higher oxides, e.g., $V_2O_5$, which do not react in a manner set forth hereinafter. The vanadium materials which are operable in the concept of this invention may be of any suitable physical form which is conventionally employed in heterogeneous catalyst systems. For example, the metal oxides may be used in an unsupported substantially pure form having a mesh size of from about 8 to about 200 or alternately they may be supported on some inert carrier such as asbestos, porcelain, quartz, kieselguhr, clay, silica, and the like. The supported vanadium oxides may be prepared by means well-known in the art, e.g., "Encyclopedia of Chemical Technology," 2nd edition, vol. 4, pp. 567–569, Interscience Publishing Co., and it is understood that neither the carrier used nor the method of catalyst-absorbent preparation forms any part of the basic invention.

In essence, the vanadium trioxide, vanadium tetroxide or mixtures thereof functions both as a catalyst and an absorbent. The reactions involved will proceed in accordance with some of the following chemical equations:

(1) $SO_2 + \tfrac{1}{2} O_2 \rightarrow SO_3$
(2) $V_2O_3 + 2SO_3 + \tfrac{1}{2} O_2 \rightarrow 2VOSO_4$
(3) $V_2O_4 + 2SO_3 \rightarrow 2VOSO_4$
(4) $2VOSO_4 \rightarrow V_2O_4 + 2SO_3$
(5) $2SO_3 \rightarrow 2SO_2 + O_2$
(6) $V_2O_4 + \tfrac{1}{2} O_2 \rightarrow V_2O_5$ In accordance with this invention, waste gases containing sulfur dioxide are contacted with the vanadium trioxide, vanadium tetroxide or mixtures thereof at a temperature within the range between about 750° and 1000° F., preferably between 750° and 850° F. and a space velocity within the range between about 1000 and 4000 hr.$^{-1}$, preferably between 1500 and 2000 hr.$^{-1}$. Under these conditions the oxygen normally present in the waste gas, e.g. 0.2 to 2 vol. percent, reacts with the sulfur dioxide to form the sulfur trioxide. The sulfur trioxide thus formed, reacts with the vanadium oxide as shown above in Equations 2 and 3 to form vanadyl sulfate.

The method of regeneration involves the thermal decomposition of the spent vanadium oxide in the presence of a sulfur dioxide atmosphere. The regeneration proceeds, for example, according to Equation 4 at a temperature within the range between about 1000° and about 1200° F., preferably 1050° to 1150° F., and at a pressure which may vary widely but is preferably substantially atmospheric. In effecting regeneration of the vanadium oxide, care must be taken to avoid the presence of significant amounts of oxygen which under the temperature conditions employed may convert the regenerated vanadium oxide to vanadium pentoxide, thereby producing a material which does not react with sulfur trioxide. Accordingly, a partial pressure, e.g. 0.01 to 0.95 atm., of sulfur dioxide is maintained in the regeneration zone so as to retard the decomposition of sulfur trioxide (Equation 5) and consequently the formation of vanadium pentoxide (Equation 6).

The contact of the vanadium oxide catalyst-absorbent with the waste gases may be accomplished by means of various well-known techniques such as fluidized, fixed or moving bed operations. With fixed bed operations, several absorbers may be employed and cyclically placed on steam and on regeneration so that uninterrupted operation may be obtained. In addition, the vanadium oxide may be contacted in a reactor which allows free fall of solids or is provided with baffles to increase contact time.

Turning now to the drawing which illustrates a preferred embodiment of this invention, a hot gas at 800° F., such as a waste gas from a boiler or smelter, containing about 0.5 vol. percent sulfur dioxide, 14.0 vol. percent carbon dioxide, 0.8 vol. percent oxygen, 6.0 vol. percent steam and 78.7 vol. percent nitrogen, is sent through line 1, passed through control valve 2 and into absorber 4 via line 3. The waste gas passing through the absorber at a space velocity of about 1500 hr.$^{-1}$ contacts fixed bed catalyst-absorbent 5, e.g., 60 mesh $V_2O_4$, at about 800° F. and essentially atmospheric pressure to thereby convert sulfur dioxide to sulfur trioxide which thereupon reacts with the vanadium tetroxide to form vanadyl sulfate. The treated waste gas, having substantially all sulfur dioxide removed or only an insignificant amount left, is removed from the absorber by line 6, passed through control valve 7 and by means of lines 8 and 9 sent to heat exchanger 10 wherein the gas is cooled to about 300° F. The gas thus cooled is vented to the atmosphere through stack 11.

Concurrently, vanadium tetroxide regeneration and concentrated sulfuric acid manufacture are carried out in regenerator 31 and acid making unit 13 respectively. Weak acid, e.g., 60% sulfuric acid, is fed into acid making unit 13 by means of line 12 and contacted at about 150° F. and atmospheric pressure with a gaseous $SO_2$-$SO_3$ mixture containing about 5.5 vol. percent $SO_3$ and about 94.5 vol. percent $SO_2$, said mixture being introduced via line 36 after having been cooled to about 300° F. in heat exchanger 26. In accordance with well-known techniques, concentrated sulfuric acid, e.g. 98% sulfuric acid, is prepared in the acid making unit and subsequently withdrawn by means of line 14. The sulfur dioxide, being essentially nonreactive to the acid feed, is taken overhead by means of line 15 and passed through acid knockout unit 16, e.g. a Brink separator, wherein entrained sulfuric acid is separated from the gas and sent via lines 17 and 18 to storage. Sulfur dioxide from makeup tank 20 may be introduced into line 19 by means of lines 21 and 23, thereby replacing any sulfur dioxide which may have been lost from the system. Blower 24 directs the sulfur dioxide via line 25 into heat exchanger 26 wherein it is heated to a temperature of about 1100° F. The heated sulfur dioxide is then passed through control valve 29 via lines 27 and 28 and thence into regenerator 31 by means of line 30. Disposed within the regenerator, there is a fixed bed of vanadyl sulfate which has been formed from the reaction of sulfur trioxide with vanadium tetroxide. The conditions of regeneration include a sulfur dioxide space velocity of about 200–500 hr.$^{-1}$. e.g. 300 hr.$^{-1}$, a temperature of about 1100° F. and a pressure which is essentially atmospheric. The sulfur trioxide formed during regeneration is, in combination with the introduced sulfur dioxide from heater 26 taken overhead through line 33 passed through control valve 34 and thence by means of line 36 introduced into the acid making unit.

The absorber and regenerator shown in the drawing are arranged so that they alternately function to remove sulfur oxide or to regenerate the vanadium oxide. For example, the spent vanadium tetroxide in absorber 4 may be regenerated under the conditions set forth above merely by closing control valves 2 and 7 in concurrence with the opening of control valves 44 and 47. Similarly, the regenerated vanadium tetroxide in regenerator 31 may be utilized to remove sulfur oxide from the waste gas merely by the proper adjustment of control valves 29, 34, 38 and 41. For example, with the control valve positions shown in the drawing being reversed, waste gas by means of lines 1 and 37 is passed through control valve 38 and thence into unit 31 via line 39, thereby converting the regeneration unit into an absorption unit. Essentially sulfur oxide free gas is taken overhead through line 40, passed through control valve 41 and line 42, cooled in heat exchanger 10 and thence vented to the stack. At the same time, hot sulfur dioxide from heat exchanger 26 is passed through control valve 44 via line 43 and thence into unit 4 by means of line 45. The sulfur dioxide and generated sulfur trioxide is taken overhead through line 46, passed through control valve 47 and subsequently sent to the acid making unit by means of lines 48 and 36.

While the invention has been described in connection with certain embodiments thereof, it is to be understood that various changes and modifications may be resorted to without departing from the spirit and scope of the invention. For example, the vanadium oxide catalyst-absorbent of this invention may be used in conjunction with a cocatalyst, e.g. copper oxide, or a coabsorbent, e.g. nickel oxide, iron oxide, zinc oxide, aluminum oxide and the like. Thus, cupric oxide which reacts with sulfur trioxide and, in the presence of oxygen, with sulfur dioxide may be used to contact the waste gases from the absorber at a temperature within the range between about 800° and 1000° F., thereby removing any small or insignificant amounts of unconverted sulfur dioxide or trioxide which have passed through the vanadium oxide-containing absorber. The cupric sulfate thus formed can be decomposed at a temperature within the range between about 1100° and 1300° F. to regenerate cupric oxide and form sulfur trioxide. Similarly, the aforementioned oxides of nickel, iron, zinc, aluminum and the like may be employed at 800° to 1000° F. to remove any small or insignificant amounts of sulfur trioxide which have passed through the absorber without reacting with the vanadium oxide. Regeneration of the thus formed metal sulfates can then be effected at 1000° to 1200° F. and substantially atmospheric pressure.

It is not intended that this invention be limited to the specific examples presented by way of illustration. The scope of the invention is limited only by the appended claims.

What is claimed is:

1. A process for the removal of sulfur oxides from a waste gas containing oxygen, which comprises contacting the gas at a temperature of 750° to 1000° F. with a catalyst-absorbent comprising a compound selected from the group consisting of vanadium trioxide, vanadium tetroxide and mixtures thereof, thereby forming the corresponding sulfate of vanadium.

2. The process of claim 1, further comprising contacting said sulfate with sulfur dioxide and simultaneously heating said sulfate at a temperature sufficient to reform said catalyst-absorbent and yield sulfur trioxide, the amount of sulfur dioxide being sufficient to retard the decomposition of sulfur trioxide.

3. A process according to claim 2 wherein said sulfate is heated in a substantially oxygen-free atmosphere at a temperature within the range between 1000° and 1100° F.

4. A process according to claim 3 wherein said sulfate is heated in the presence of an amount of sulfur dioxide which is sufficient to essentially prevent the decomposition of sulfur trioxide.

5. A process according to claim 3 wherein said catalyst-absorbent comprises vanadium tetroxide.

6. The process of claim 1, further comprising contacting the hot waste gases with a metal oxide selected from the group consisting essentially of cupric oxide, nickel oxide, ferric oxide, aluminum oxide and mixtures thereof.

References Cited

UNITED STATES PATENTS 2,927,001   3/1960   McCullough _____ 23—178 X
3,362,786   1/1968   Burkhardt _____ 23—175

OSCAR R. VERTIZ, *Primary Examiner.*

E. C. THOMAS, *Assistant Examiner.*

U.S. Cl. X.R.

23—117, 174, 178; 75—116